United States Patent

[11] 3,572,632

[72] Inventor Gosta Bengtsson
 Farsta, Sweden
[21] Appl. No. 805,654
[22] Filed Mar. 10, 1969
[45] Patented Mar. 30, 1971
[73] Assignee Sundstrand Hydraulic AB
 Huddinge, Sweden

[54] FLAP VALVE
 3 Claims, 4 Drawing Figs.
[52] U.S. Cl. .................................................. 251/306
[51] Int. Cl. ............................................... F16k 1/22
[50] Field of Search ........................................ 251/306, 89

[56] References Cited
UNITED STATES PATENTS
2,027,978 1/1936 Hoff .......................... 251/306
2,586,927 2/1952 Fantz .......................... 251/306
3,081,791 3/1963 Wheatley .................... 251/306X
3,111,300 11/1963 Boone ......................... 251/306
FOREIGN PATENTS
1,300,519 6/1962 France ........................ 251/306

Primary Examiner—Henry T. Klinksiek
Attorney—Holman and Stern

ABSTRACT: A flap valve in which a flap mounted in a cylindrical bore and which is pivotal from a closed to open position, and vice versa, about an axle oriented perpendicular to the longitudinal axis of the cylindrical bore, has the rotation axis of the flap located on one side of the sealing plane of the flap at a certain distance thereto and unsymmetrically in the bore with said distance to the longitudinal symmetry axis of the cylindrical bore.

Patented March 30, 1971

INVENTOR
Gösta Bengtsson

By Holman, Glascock, Downing
  & Seebold
           ATTORNEYS

FLAP VALVE

This invention relates to a flap valve. In such valves a flap is pivotally mounted in a cylindrical bore about an axle extending perpendicular to the axis of the cylindrical bore.

The object of the invention is to eliminate leakage past the axle of rotation of the flap at its two mountings in the cylindrical bore.

This object is achieved by the characterizing features defined in the accompanying claims. The invention also brings about a certain self-closing effect in one direction of rotation of the flap, i.e. in one of the two closing flow directions of the valve.

Three embodiments of the invention are described in connection with the enclosed drawings.

The flap valve comprises a cylindrical bore 1 and a circular flap 2. The flap is pivotal about an axle 3 mounted in the wall of the bore 1. The axle 3 is mounted at the side of the flap 2. The center of the axle thereby is located unsymmetrically in the bore 1 and at a distance from the central line 5 of the bore which is equal to the distance between the center of the axle 3 and closing plane 4 of the flap 2. Owing to this location of the axle, the mountings of the axle in the bore 1 are situated entirely on one side of the closing plane, i.e. in FIG. 1 entirely downwardly of the line 4. Liquid flowing downwards from above in FIG. 1, therefore, cannot penetrate into the mountings when the flap is closed and seals against the inside surface of the cylindrical bore.

Figure 1:
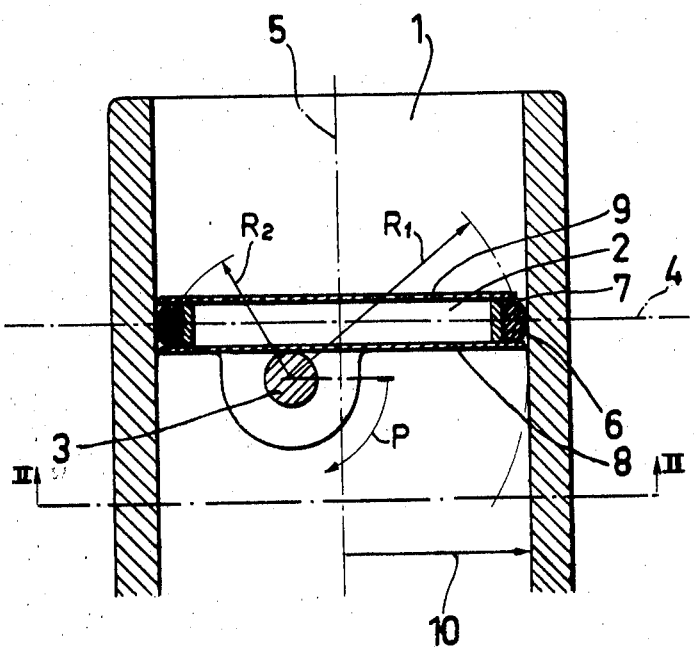
FIG. 1 is a longitudinal section of one embodiment.

In the flap a groove is provided which extends all around the flap and into which a rubber ring 6 is placed. This ring improves the sealing between the flap 2 and the bore 1. Furthermore, a snapping effect is obtained when the flap is turned to closing position and the ring is compressed. In the embodiment shown in FIG. 1, the flap comprises two plates 8 and 9 connected in a spaced relationship, and between which plates the sealing ring 6 is placed around the circumference thereof. Due to the location of the flap rotation axle 3 to the side of the plates, the plate 9 located farthest away from the axle must be given a diameter less than the bore diameter, provided that the flap 2 in the closed position is to assume a position perpendicular to the axis 5 of the bore 1. In FIG. 1, the flap 2 is in the closed position, and when being opened, it is turned in the direction of arrow P. For geometric reasons, the plates 8 and 9 then must have a diameter less than that of the bore 1 for being able to pass free of the inside surface of the bore when pivoting from and into the position shown in FIG. 1, i.e. perpendicular to the bore. The thickness of the flap being assumed to be 5 mm., the distance from the center of the rotation axle to the closing plane 4 with 5 mm., and the bore diameter to be 34 mm., then the diameter of the upper plate 9 must not exceed 31.2 mm., and the diameter of the lower plate must not exceed 33.6 mm. $R'$ designates the circle arc within which the right-hand outer ends of the plates must move at turning, and $R2$ designates the corresponding circle arc for the left-hand end of the lower plate 8. As appears, the corresponding end of plate 9 can be permitted to extend past the arc with the radius $R2$, because the opening of the flap is effected by turning in the direction of arrow P. It is, thus, possible to obtain a stop position for the flap rotation by adjusting the extension of plate 9 to the left in the FIG. In FIG. 1, the end of the plate strikes against the inside surface of the flap and, consequently, the flap cannot rotate further in the direction against arrow P.

Figure 2:
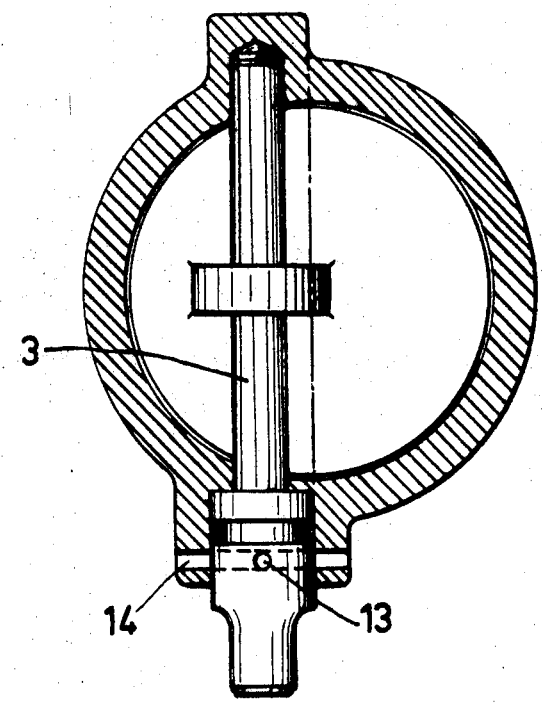
FIG. 2 is a horizontal view with a section through the cylindrical bore at the places where the axle of rotation is mounted.

FIG. 2 shows a section along the line II–II in FIG. 1 and 13 and 14 designate holes in the axle 3 and in a bearing eye for the axle, respectively. By inserting split pins into the holes in their aligned position, the flap is locked in this position.

Figure 3:
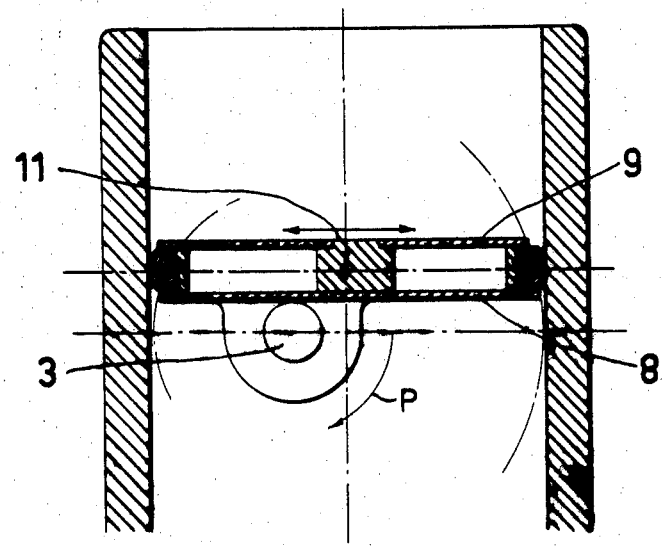
FIG. 3 is a longitudinal section of a second embodiment of the flap.

FIG. 3 shows an embodiment in which the upper plate 9 so is mounted in a dovetail cut 11 that it can be moved perpendicular to the rotation axle 3 of the flap. When the plate 9 in the position shown in FIG. 3 is moved to the right as far as possible, the flap is locked in this closing position and cannot be turned in the direction of arrow P unless the plate 9 is moved back so much that it moves free of the inside surface of the bore.

Figure 4:
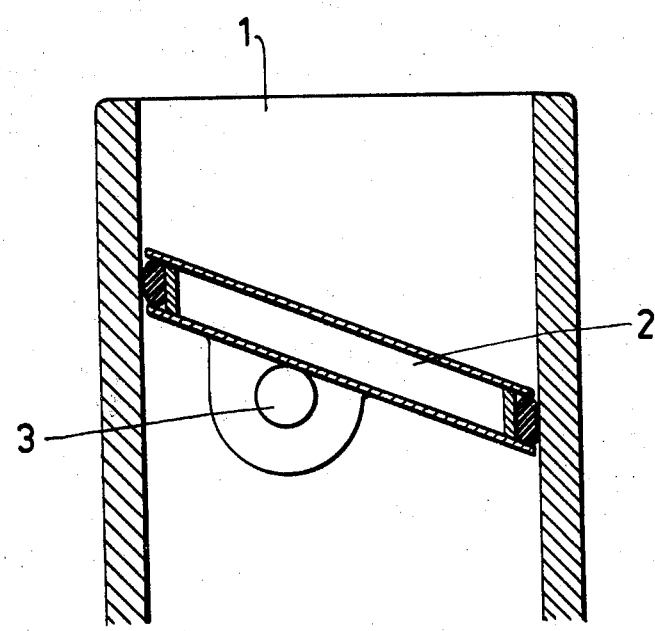
FIG. 4 is a longitudinal section illustrating the closed position of the valve where the flap has an elliptical shape.

FIG. 4 shows the closing position of the flap when it has an elliptical shape.

I claim:

1. Flap valve comprising a flap mounted in a cylindrical bore and being pivotal from a closed to an opened position, and vice versa, about an axis oriented perpendicular to the longitudinal axis of the cylindrical bore, the rotation axis of the flap being located on one side of the sealing plane of the flap at a certain distance thereto and unsymmetrically in the cylindrical bore with said distance to the longitudinal symmetry axis of the cylindrical bore, said flap comprising two plates connected in a spaced-apart relationship, a sealing ring positioned between the plates so as to extend beyond the defining edges of the plates, the plate located farthest away from the rotation axle of the flap having an extension in the direction perpendicular to the rotation axle and measured from the plate center, said extension being less than the radius of the cylindrical bore, and so dimensioned, that the plate upon turning the flap to a position perpendicular to the cylindrical bore moves free of the inside surface of the cylindrical bore and said plate in the opposite direction having an extension at least corresponding to the radius of the cylindrical bore.

2. Flap valve according to claim 1, characterized in that the plate located farthest away from the rotation axle is so mounted in a dovetail cut that it can be moved in parallel in relation to the other plate and perpendicularly to the rotation axle of the flap, and the sealing ring being placed on the periphery of the flap in a groove between the two plates.

3. Flap valve according to claim 1, characterized in that the flap has an elliptic shape and the bore has a circular cross section.